United States Patent [19]

Mayhew et al.

[11] Patent Number: 5,654,885
[45] Date of Patent: Aug. 5, 1997

[54] VALVE POSITION CONTROLLER

[75] Inventors: John Mayhew, Salem; Dwayne M. Puckett, Roanoke, both of Va.

[73] Assignee: Virginia Valve Company Corporation, Salem, Va.

[21] Appl. No.: 411,889

[22] Filed: Mar. 28, 1995

[51] Int. Cl.$^6$ .............................. G05B 11/16; F16K 31/12
[52] U.S. Cl. ..................... 364/181; 364/510; 137/487.5
[58] Field of Search ..................................... 364/181, 180, 364/138, 141, 509, 510; 137/1, 2, 565, 566, 567, 569, 487.5, 900; 60/394; 251/129.03

[56] References Cited

U.S. PATENT DOCUMENTS

| | | | |
|---|---|---|---|
| 4,096,699 | 6/1978 | Zitelli | 60/657 |
| 4,417,312 | 11/1983 | Cronin et al. | 364/510 |
| 4,430,846 | 2/1984 | Presley et al. | 56/10.2 |
| 4,744,542 | 5/1988 | Heusser | 251/30.1 |
| 5,081,904 | 1/1992 | Horn et al. | 91/420 |
| 5,097,857 | 3/1992 | Mayhew | 137/1 |
| 5,198,973 | 3/1993 | Steutermann | 364/167.01 |

OTHER PUBLICATIONS

Automax Inc., Positioners Pneumatic & Electro–Pneumatic, Aug. 1993.
Uni Measure; Transducers to Measure, undated.
Virginia Valve Company Corporation; Electro–Hydraulic & Pneumatic Value Actuation System; undated.

*Primary Examiner*—Reba I. Elmore
*Assistant Examiner*—Brian C. Oakes
*Attorney, Agent, or Firm*—Griffin, Butler, Whisenhunt & Kurtossy

[57] ABSTRACT

A valve position controller (10) for controlling the position of an industrial-valve element (29, 29') includes a check valve (72, 74) in each of closing and opening pressurized-fluid input lines (68, 70) for respectively leading pressurized fluids from a pressurized source (30) to closing and opening solenoid actuating valves (106, 104) via a common input fork (62). The valve position controller can be changed between a fail-in-place" mode, and a "fail-closed" mode by interchanging input and exhaust lines (68, 88) to an opening actuating valve (64) and reversing electrical operation of a solenoid (104) of the opening actuating valve. A needle valve (94) in a common exhaust line allows speed of the system to be optimized for a set resolution. Locking actuating valves (108, 110) are respectively between the closing and opening actuating valves and a motivator (34, 36) to lock the industrial valve element (29', 29) in position when close and open manual switches (48, 50) are not activated and an auto/manual switch (46) is in a "manual" position.

13 Claims, 3 Drawing Sheets

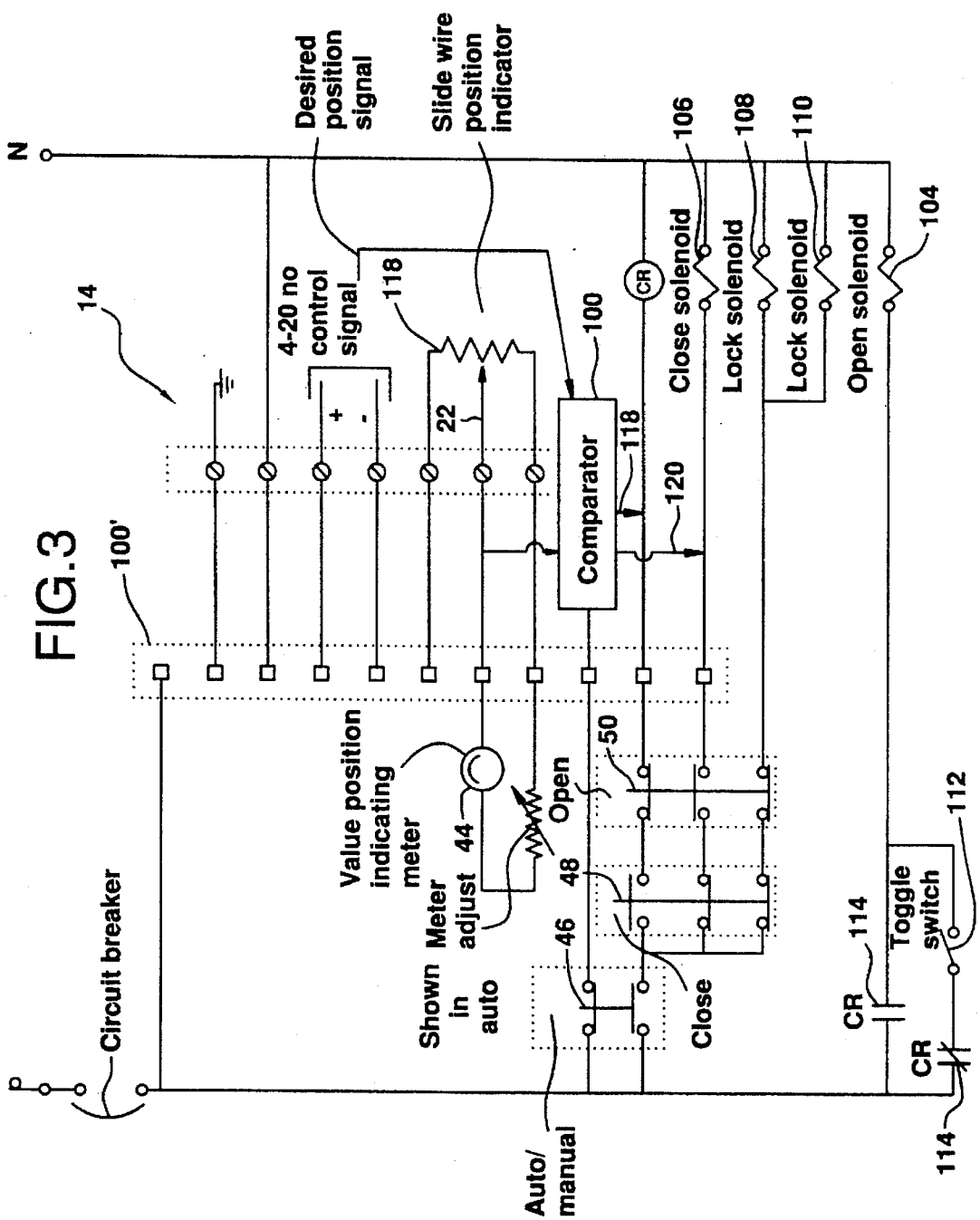

VALVE POSITION CONTROLLER

BACKGROUND OF THE INVENTION

This invention relates generally to the art of industrial automatic control devices and more specifically to valve position controllers.

It is well known that factories and other industrial installations are increasingly automated. There are, for example, apparatus for automatically and continuously repositioning industrial valves to achieve desired fluid flows. Often desired flows change with changing conditions. For example, it may be desirable to control fluid flow so as to maintain a selected pressure, temperature, flow rate, or level. In fact, many industrial installations include fluid-condition transducers for monitoring flow (as measured by temperature, pressure, flow rate, etc.), with electrical signals issued by such transducers being graduated between 4–20 milliamps (ma). Similarly, many industrial valves include valve position feedback potentiometers, or transducers, sometimes housed in limit switches, for providing signals which are indicative of valve positions (i.e. open, closed, 3% open, etc.). Normally, a valve position signal is used to provide a visual readout as to a valve's position. In some cases a fluid-condition signal is fed to a set point process controller which determines therefrom a new desired-position of an industrial valve element. The set point process controller then sends a "desired-position signal" to a value position controller which adjusts the industrial valve element to the new position by means of a pressurized-fluid system (such as a pneumatic system). Changing the position of the industrial valve element causes a desired change in the condition of the fluid.

It is known in the prior art to provide a valve position controller which employs mechanical/pneumatic feedback from an industrial valve to the pressurized-fluid system so that the pressurized-fluid system stops moving the industrial valve element once the industrial valve element achieves the new desired position ordered by the set point process controller. Such a system is sold by Automax, Inc. under the mark AUTOMAX H-4000. A problem with such a mechanical/pneumatic feedback is that it requires the use of "instrument air" (highly clean air) for both actuating an industrial valve motivator and in a feedback path. In this regard, air used to activate the pneumatic motivator is the same air as must be used in the mechanical/pneumatic feedback. Yet another difficulty with this system is that pneumatic feedback controls are rather imprecise in operation and, if they are made to be highly precise, are expensive to manufacture. Still further, mechanical/pneumatic feedback systems must usually be mounted at the industrial valves and they are therefore difficult to inspect and adjust. Also, they require a continuous flow of air even when no valve adjustment is necessary.

Thus, it is an object of this invention to provide a valve position controller which does not have to be energized by instrument air. Similarly, it is an object of this invention to provide a pressure-activated valve position controller which can be activated pneumatically or hydraulic. Along the same line, it is an object of this invention to provide a valve position controller which is highly precise in its operation but yet which does not require the use of many mechanical parts. It is an object of this invention to provide a valve position controller which does not require a continuous flow of air, or other undue power consumption, when no valve adjustments are necessary.

It is also an object of this invention to provide a valve position controller which can be easily adjusted and which can be easily switched between a manual mode of operation and an automatic mode of operation.

It is suggested in U.S. Pat. No. 5,198,973 to Steutermann that a position transmitter generate a digital binary coded position signal of an industrial valve element. A comparator device compares the binary coded position signal and a desired binary coded command signal and, when there is a mismatch, activates actuating valves to control flow of pressurized fluid to a motivator device for moving the industrial valve element to a desired position. A digital feedback tells the position transmitter when the industrial valve element has achieved the new position. Although Steutermann's apparatus has the advantage of speed, it has a disadvantage in that the position transmitter is limited to producing 100 position signals. That is, a resolution no greater than 100 appears to be possible. It is thought that this limitation is caused by a physical need to mount and separate hall effect sensors in the position transmitter, one for each different position. Yet another difficulty with the digital device is that it is complex, and therefore cannot be easily worked on by average technicians in the field.

Thus, it is an object of this invention to provide a valve position controller which is quite fast in operation yet which provides a high resolution. It is also an object of this invention to provide a valve position controller which is relatively uncomplicated in structure and which can, therefore, be worked on in the field by technicians.

An analog electrical comparator system has been sold by the Virginia Valve Company Corporation under the mark M-92 POSITIONER/CONTROLLER which uses neither a pneumatic feedback signal nor a digital signal for determining new positions of industrial valves, but rather which uses an analog electrical position signal, from a potentiometer for example. In this suggested system a set point process controller receives a signal from a fluid-condition transducer and determines therefrom a desired position of an industrial valve controlling flow through a conduit. The determined desired-position signal is fed to a comparator of a valve position controller which also receives an electrical actual-position signal from a valve position feedback potentiometer coupled to an industrial valve motivator. When there is a difference between the actual-position signal and the desired-position signal the comparator produces control signals which activate electrical opening and closing solenoids for controlling pressurized fluid flow through closing and opening lines to the valve motivator to open and close the industrial valve as required. Once the actual-position signal and the desired-position signal are equal the comparator deactivates the opening and closing solenoids. When the opening and closing solenoids are deactivated, opening and closing actuating valves are biased to move to positions which allow pressurized fluid to flow to both sides of the industrial-valve actuator, thereby locking the industrial-valve motivator in a fail-in-place condition.

Although this system has the advantage of simplicity, it also has some problems. One problem with this system is that when both sides of the motivator are pressurized there is usually some "drift". That is, the motivator does not maintain its position, but rather drifts to a new position.

Another problem with this analog electrical comparator system is that it can be difficult to adjust it to accommodate different resolutions. That is, if the system is adjusted to a high resolution, so as to have 160 possible positions of the industrial valve, for example (with small intervals between adjacent positions), it is difficult to keep the motivator from repeatedly overshooting desired positions and thereby causing oscillations of the pressurized-fluid motivator.

Still another difficulty with such an electrical analog comparator valve position controller is that it cannot be easily switched to a manual mode in which the fluid-pressure motivator is directly controlled (not including the comparator) manually. When the system is placed in such a manual mode the comparator feedback must be disabled. Thus, once the industrial valve element has been manually moved to a new position there is nothing to maintain it there. There will be drift.

It is therefore an object of this invention to provide an electrical, analog, valve position controller which employs a comparator which can be adjusted to operate at resolutions up to 160. It is also an object of this invention to provide such a valve position controller which does not allow an industrial-valve pressure-fluid motivator to drift once the industrial-valve element is in a new position. Yet another object of this invention is to provide such an electrical analog comparator valve position controller which can be easily switched between an automatic mode of operation and a manual mode of operation.

Yet another object of this invention is to provide an electrical analog, valve position controller which, when it is in a manual mode of operation, has positive control over movement of the industrial-valve motivator, but which does not allow any drift when the industrial-valve fluid actuated motivator is turned off.

SUMMARY OF THE INVENTION

According to principles of this invention, an electrical analog valve position controller having a comparator has check valves in closing and opening input lines thereof between a common fork and closing and opening actuating valves. These check valves reduce industrial valve drift when the closing and opening actuating valves are in home positions. An electrical mode switch for reversing operation of one of the closing and opening actuating valves allows an operator to change a fail safe mode of the valve position controller by reversing input and exhaust lines of the respective one of the closing and opening actuating valves. A finely controlled valve in a common exhaust line of the closing and opening actuating valves allows an operator to easily adjust operation speed to a resolution of the valve position controller. Locking solenoid valves in intermediate lines between the closing and opening actuating valves and the industrial-valve motivator lock the position of the industrial valve when close and open switches are not engaged in a manual mode.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 3 is a schematic electrical circuit diagram showing many of the features also shown in FIG. 2, but in another form.

DESCRIPTION OF THE PREFERRED EMBODIMENT

Figure 1:
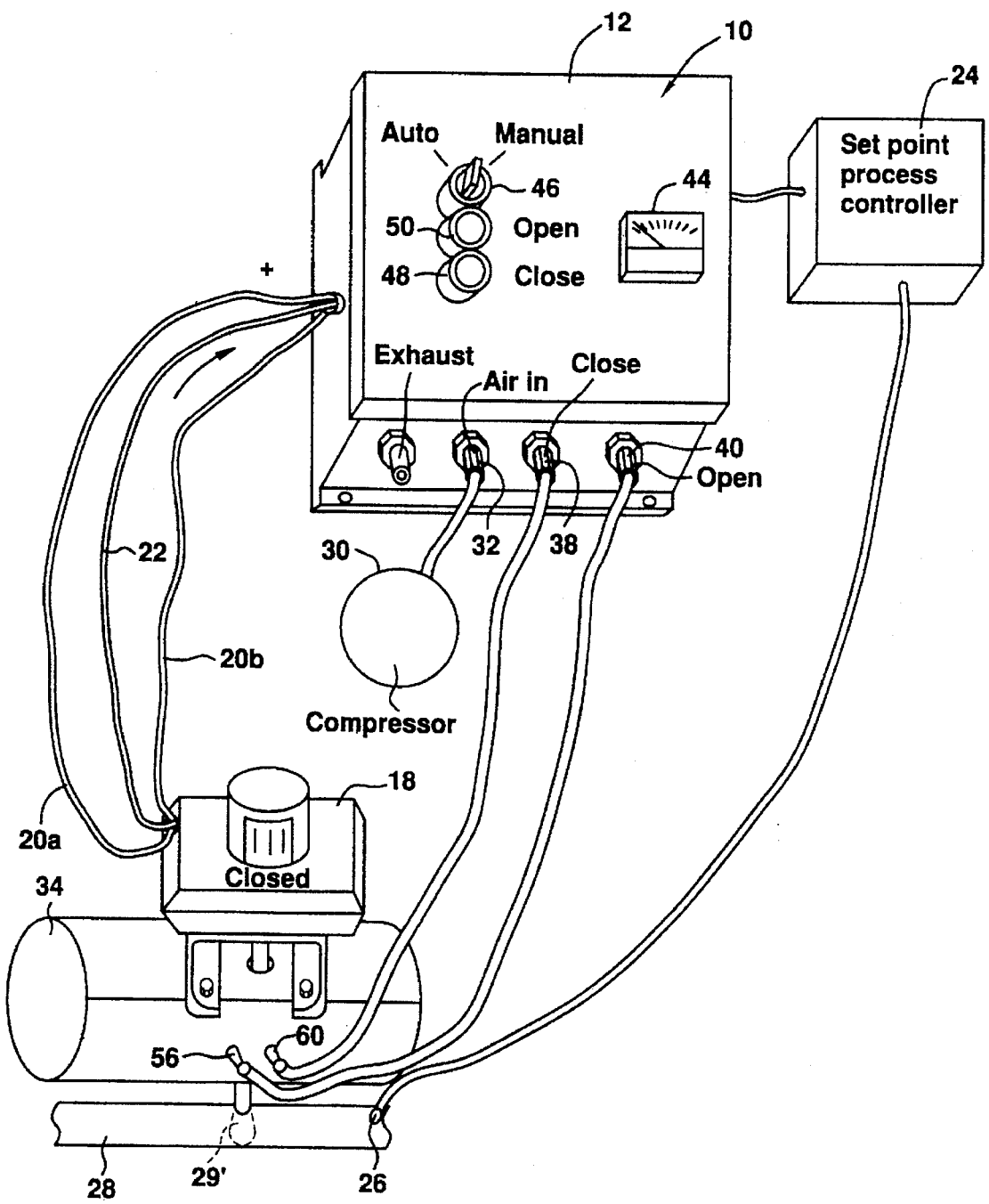
FIG. 1 is a schematic isometric view of a valve position controller of this invention shown controlling an industrial butterfly valve with a rack and pinion industrial valve actuator.

The structure and operation of a valve position controller 10 will be described with reference mainly to a FIG. 2 embodiment, although comparable elements in a FIG. 1 arrangement are also sometimes referred to. It will be understood that comparable elements of the FIG. 1 embodiment also operate in substantially the same manner as do the elements described with reference to FIG. 2.

The valve position controller 10 comprises a housing 12 an electrical circuit 14 and a pressurized-fluid circuit 16. The electrical circuit 14 is coupled to a valve position feedback potentiometer 18, sometimes housed in a limit switch, by reference voltage lines 20a and 20b and by a position feedback signal line 22. It should be understood that positive and negative power designations and ground designations are representative of relative voltage and not as an indication that lines must be grounded or positively or negatively charged. The electrical circuit 14 is also connected to a set point process controller 24 which is, in turn, coupled to a fluid condition transducer 26 which measures a condition of fluid whose flow through a conduit 28 is controlled by an industrial valve, shown as a butterfly valve 29' in FIG. 1 and as a gate valve 29 in FIG. 2. It should be understood that although the fluid-condition transducer 26 is actually shown in a configuration in which it would come into contact with fluid, in some embodiments it would not come in contact with fluid. For example, it could measure an outside temperature of a conduit.

Figure 2:
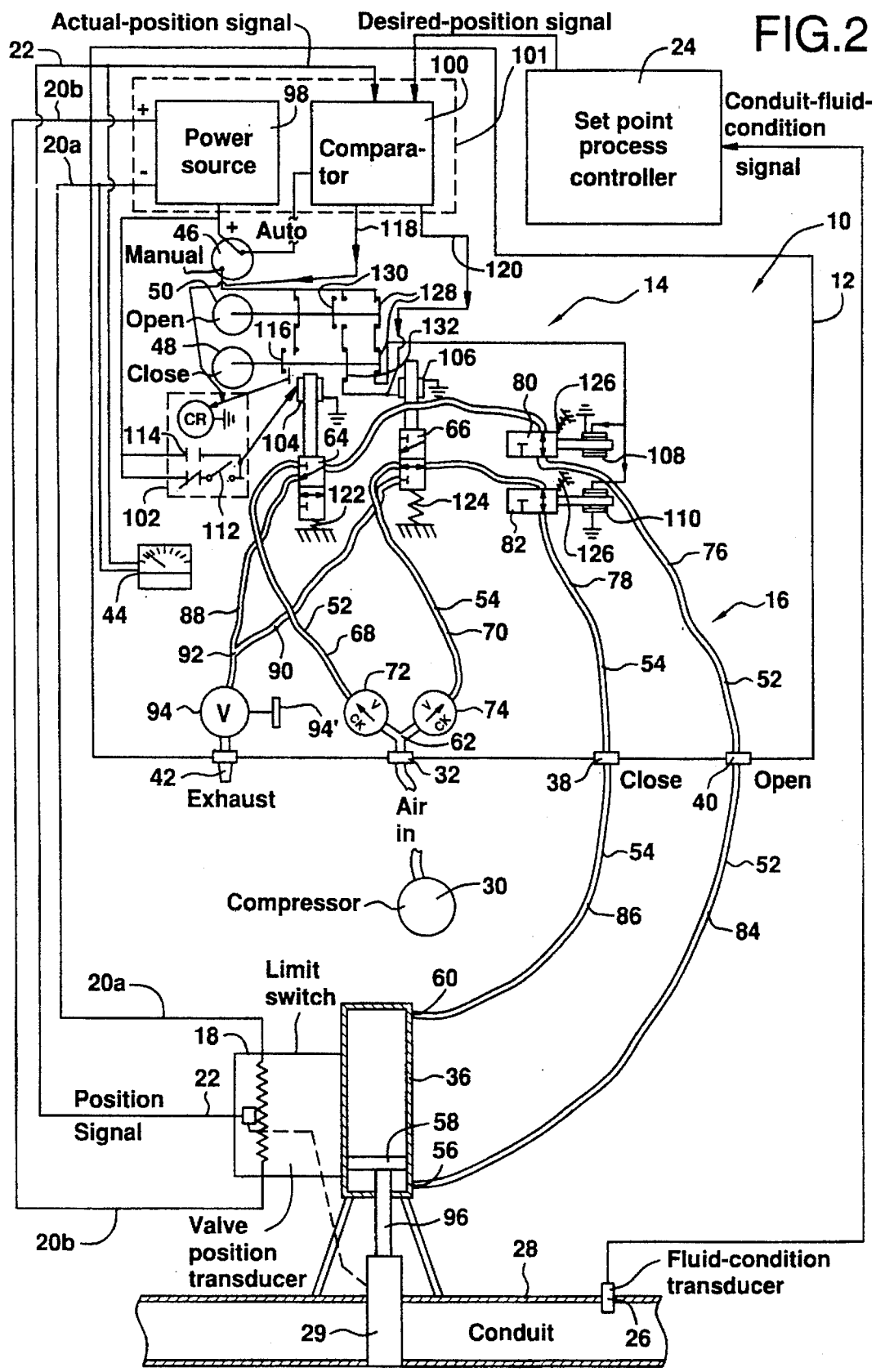
FIG. 2 is a schematic, partially-block partially-circuit, diagram showing both a pressurized fluid circuit and an electrical circuit of the valve position controller of this invention.

The pressurized-fluid circuit 16 is coupled to a compressor 30 at an air-in nipple 32 of the housing 12 and to a fluid-pressure industrial-valve motivator, 34 in FIG. 1 and 36 in FIG. 2, at close and open nipples 38 and 40. The pressurized-fluid circuit 16 is exhausted at an exhaust muffler (or nipple) 42 on the housing 12.

Generally, the set point process controller 24 receives a signal from the fluid-condition transducer 26 telling the set process controller 24 if more or less fluid flow is required. The set point process controller 24 then sends a desired-position signal to the valve position controller 10 telling it to move the industrial valve (29' in FIG. 1, 29 in FIG. 2) to a certain position. The valve position controller 10 then controls the flow of pressurized fluid to the industrial-valve motivator (34 in FIG. 1 and 36 in FIG. 2) to move the industrial valve 29', 29 to the new position and the position of the valve 29', 29 is monitored by the position feedback potentiometer of limit switch 18. In this invention, the position of the valve is sent back to the valve position controller 10 via the position feedback signal line 22 so that the valve position controller 10 can know when the valve is in the position ordered by the set point process controller 24. The position of the valve can also be read by an operator from a meter 44 positioned on the outside of the housing 12. An auto/manual switch 46, also positioned on the outside of the housing 12, can be switched to a "manual" position, as shown in FIG. 1, in which the industrial valve 29', 29 can be operated by manual close and open switches 48 and 50.

Looking at this invention now in more detail, the pressurized-fluid circuit 16 comprises an opening line 52 and a closing line 54. The opening and closing lines 52 and 54 are so designated because when fluid pressure is applied thereto these lines respectively tend to open and close the industrial valve 29', 29. For example, if the opening line 52 is pressurized through to an opening port 56 on the industrial-valve motivator 34, 36, this would tend to drive an impeller, such as a piston 58 in FIG. 2, in the industrial-valve motivator to move the valve 29 toward an open position. Similarly, when the closing line 54 is pressurized through to a closing port 60 this tends to close the valve 29. The opening and closing lines both receive compressed fluid (air in a preferred embodiment) from the compressor 30 via an input fork 62. The pressurized air is led to an opening actuating valve 64 and a closing actuating valve 66 by means of opening and closing input lines 68 and 70 (forming parts of the opening and closing lines 52, 54) which respectively have opening and closing check valves 72 and 74 therein for allowing flow from the input fork 62 to the opening and closing actuating valves 64, 66 but not allowing flow back from the opening and closing actuating valves 64 and 66 toward the input fork 62. The opening and closing lines 52 and 54 also include intermediate opening and closing lines 76 and 78 between the opening and closing actuating valves 64 and 66 and the open and close bulkheads (or nipples) 40 and 38, with opening and closing locking valves 80 and 82 being in these intermediate opening and closing lines 76 and 78. The open and close bulkheads 40 and 38 are coupled by fluid lines 84 and 86 respectively to the opening port 56 and the closing port 60 of the industrial-valve motivator 36.

Opening and closing exhaust lines 88 and 90 complete the opening and closing lines, or circuits, 52, 54 by respectively extending from the opening and closing actuating valves 64, 66 to an exhaust fork 92 which leads to the exhaust muffler 42 via a manually-controlled, gradual, needle valve 94. The system depicted in FIGS. 1 and 2 is a pneumatic system, thus, pneumatic fluid is exhausted to atmosphere at the exhaust muffler 42. If the system were a hydraulic system, fluid would be recycled.

In the configuration shown in FIG. 2, the pressurized-fluid circuit 16 closes the industrial valve 29. That is, the three-way closing actuating valve 66 is biased upwardly by its spring 124 to allow pressurized fluid to flow into the closing port 60 of the industrial-valve motivator 36, thereby causing the piston to move downwardly while the three-way opening actuating valve 64 is moved downwardly by the opening solenoid 104 to allow fluid flow from the opening port 56 of the industrial-valve motivator 36 to the exhaust muffler 42. It should be understood that if the positions of the opening and closing actuating valves 64 and 66 were reversed then the industrial valve 29 would be opened. However, if both the opening and closing actuating valves 64 and 66 were moved to an up configuration by their springs 122, 124, so that both of them allow pressurized fluid flow to the closing and opening ports 60 and 56 this would tend to lock the piston 58, and the attached industrial valve 29, in position.

The check valves 72 and 74 prevent drift of the piston 58, and the attached industrial valve 29, by not allowing flow from the opening port 56 to the closing port 60, or vice versa, via the opening and closing lines 52 and 54. In this regard, especially in the configuration shown in FIG. 2, when an equal pressure is applied to the opening and closing ports 56 and 60 a greater force is applied to the piston 58 toward a closing position because a piston shaft 96 occupies reaction space on a bottom side of the piston. Thus, if the check valves 72 and 74 were not in the input lines 68, 70, the piston 58 would tend to move toward a closed position of the industrial valve 29 when both the opening and closing ports 56 and 60 are pressurized.

Looking now in more detail at the electrical circuit 14 for controlling the opening and closing actuating valves 64 and 66, this circuit comprises a power source (or power supply) 98, a comparator 100, the auto/manual switch 46, the manual close switch 48, the manual open switch 50, failure-select toggle 102, an opening solenoid 104, a closing solenoid 106, and locking solenoids 108 and 110. In a preferred embodiment the power source 98 and the comparator 100 are integrated into a single composite component 101, however, they are shown separated here for purposes of illustration.

The power source 98 provides power (½ Volt DC) to the limit switch 18 so that the position feedback signal 22 can be recovered therefrom and fed to the comparator 100 and to the meter 44. As mentioned above, the meter 44 provides a visual readout of the position of the industrial valve 29.

When the auto/manual switch 46 is in the "manual" position power is bypassed from the power source 98 to the opening and closing solenoids 104, 106 via contacts of the manual open and close switches 48 and 50. However, when the auto/manual switch 46 is in the auto position power is fed to the opening and closing solenoids 104, 106 via the comparator 100. In both positions of the auto/manual switch 46 the failure-select toggle 102 allows an operator to reverse the manner in which power is applied to the opening solenoid 104, depending upon the position of a toggle switch 112. In this regard, the failure-select toggle 102 does not apply energy directly to the opening solenoid 104, but rather has a control solenoid CR which closes a contact switch 114. That is, if the auto/manual switch 46 is in the "manual" position and the push-button manual close switch 48 is depressed, thereby closing a contact 116, the control solenoid CR is energized to, in turn, close the contact switch 114 for allowing power to flow from the power source 98 to the opening solenoid 104. However, if the toggle switch 112 is closed, the control solenoid CR effects the contact switch 114 in an opposite manner. That is, if the close switch 48 is not depressed the contact switch 114 is closed to thereby energize the opening solenoid 104, but when the close switch 48 is depressed, the control solenoid CR opens the contact switch 114 to thereby cut off energy to the opening solenoid 104.

As mentioned above the opening and closing actuating valves 64, 66 are biased toward an up position as shown in FIG. 2 by means of the springs 122, 124 so that, in their home positions, the opening and closing actuating valves 64, 66 allow pressure from the compressor 30 to reach the opening and closing ports 56, 60 to thereby lock the piston 58, and its attached industrial valve 29, in position.

Describing now operation of the valve position controller 10 of this invention, the housing 12 is usually mounted remotely from the industrial valve 29 and the industrial-valve motivator 36. Of course the industrial-valve motivator 36 is normally mounted directly adjacent to the industrial valve 29. In any event, the various pressurized fluids and electrical lines are connected between the valve position controller 10 and the fluid-condition transducer 26, the valve position feedback potentiometer of the limit switch 18, and the industrial-valve motivator 36, as is shown in FIG. 2.

Operation of the system will first be described with the auto/manual switch 46 in the "auto" position. The set point process controller 24 receives a conduit-fluid-condition signal from the fluid-condition transducer 26 and makes a determination as to a desired position of the industrial valve 29. If the fluid condition is correct (the flow rate or temperature, for example, is at a desired level) the set point process controller continues to feed the same industrial-valve position to the comparator 100. However, should the fluid condition change to an undesirable level, the set point process controller 24 feeds a new desired-position signal to the comparator 100. When this happens, the actual-position signal fed to the comparator from the valve position feedback potentiometer of the limit switch 18 is no longer balanced with the desired-position signal coming from the set point process controller 24. In order to bring these signals back into balance, the comparator energizes the appropriate opening and closing solenoid 104, 106 via opening and closing leads 118 and 120. At this point it is assumed that the toggle switch 112 is open so that a signal applied to the opening lead 118 energizes the opening solenoid 104.

Thus, for example, if the industrial valve 29 is to be closed the open solenoid 104 of the opening actuating valve 64 is energized to move the opening actuating valve 64 downwardly, away from its home position, to exhaust the intermediate opening line 76. This allows pressure in the intermediate closing line 78 to drive the piston 58 downwardly and close the industrial valve 29.

Eventually, the actual-position signal coming from the valve position feedback potentiometer of the limit switch 18 will balance with the desired-position signal coming from the set point process controller 24 and the comparator 100 will discontinue energizing the opening and closing solenoids 104, 106.

As mentioned above, the check valves 72 and 74 prevent undue drift of these elements once they are locked in position in this manner and thereby enhance stability. However, should there still be some minor drift, the comparator 100 will again energize the appropriate opening and closing solenoids 104 and 106 to move the piston 29 back to the position set by the set point process controller 24.

Describing next operation of the valve position controller 10 when the auto/manual switch 46 is switched to the "manual" position, in this configuration the comparator 100 is no longer energized and therefore no longer active. Instead, the close and open switches 48 and 50 are energized. As can be seen in FIG. 2, if neither of the manual push button close and open switches 48 and 50 is depressed, contacts 128 of these switches energize the locking solenoids 108 and 110 to thereby overcome biasing springs 126 to move the opening and closing locking valves 80 and 82 to locking positions in which they do not allow flow through the intermediate opening and closing lines 76 and 78 (moved to the right from positions shown in FIG. 2). As can be seen in FIG. 2, the locking solenoids 108 and 110 operate together to either fully lock or fully open the intermediate opening and closing lines 76 and 78, with these lines being locked when neither of the close and open switches 48, 50 is depressed, but being open when either of the close or open switch 48 or 50 is depressed. As can be seen in FIG. 2, when either of the close or open switches 48 or 50 is depressed the appropriate opening and closing solenoid 104 and 106 is activated to bring about a respective closing or opening of the industrial valve 29. For example, if the push button close switch 48 is depressed, its contact 128 is opened to thereby deactivate the locking solenoids 108 and 110 (to allow the opening and closing locking valves 80 and 82 to unlock the intermediate closing and opening lines 76, 78 as shown in FIG. 2) and at the same time, the contact 116 is closed to energize the opening solenoid 104. The opening solenoid 104 overcomes the spring 122 to move the opening actuating valve 64 downwardly, thereby exhausting the industrial-valve motivator 36 at its opening port 56 so that the valve 29 will close as shown in FIG. 2. When the push button close switch 48 is depressed, as described above, the closing actuating valve 66 remains in the up position under force of its spring 124 so that the closing port 60 of the industrial-valve motivator 36 remains pressurized. The closing solenoid 106 of the closing actuating valve 66 cannot now be energized because when the push button close switch 48 is depressed a contact 132 is opened. As soon as the push button close switch 48 is released, both locking contacts 128 are again closed to thereby energize the locking solenoids 108, 110 to move the opening locking valves 88 and 82, against their biasing springs 126, to locking positions (to the right in FIG. 2).

A similar operation occurs when the push button open switch 50 is depressed instead of the push button close switch 48 to thereby open its contact 128 and close its contact 130.

In the configuration described so far, with the toggle switch 112 open, the valve position controller 10 of this invention is in a "fail-in-place" configuration. That is, if there is a power failure to the valve position controller 10, both the opening and closing actuating valves 64 and 66 are forced to the up position by the springs 122 and 124 so that pressure from the compressor 30 is applied to both the opening and closing ports 56 and 60 of the industrial-valve motivator 36. As mentioned above, this locks the piston 58, and the industrial valve 29, in place.

However, in some modes of operation it is desirable for the industrial valve 29 to fail in a "failclosed" configuration. That is, should there be a failure of power or control signal the industrial valve 29 should be automatically moved to a closed position. This can easily be accomplished with the valve position controller 10 of this invention in an uncomplicated manner by simply closing the toggle switch 112 and, at the same time, reversing the attachments of the open input and exhaust lines 68 and 88 to the opening actuating valve 64. When the open input and exhaust lines 68 and 88 are reversed, operation of the opening actuating valve 64 is reversed such that when it is forced to its non-energized position by the spring 122 it is exhausting fluid from the opening port 56 of the industrial-valve motivator 36. This, of course, closes the industrial valve 29. In order to compensate for this valve-action reversal, operation of the opening solenoid 104 must also be reversed by closing the toggle switch 112. When the toggle switch 112 is closed the opening solenoid 104 is actuated to place the opening actuating valve 64 in its down position, when the comparator 100 is not providing a signal on the opening lead 118 (when the auto/manual switch is in the "auto" position) nor is the close switch 48 depressed (when the auto/manual switch 46 is in the "manual" position). However, since the pressure input line 68 and the exhaust line 88 have also been reversed at their connections with the opening actuating valve 64, when the opening actuating valve 64 is in this down position, both the opening port 56 and the closing port 60 of the industrial-valve motivator 36 are pressurized to thereby lock the piston 58 in position. Now when an actuating signal is applied to the control solenoid CR (by the comparator 100 in the auto mode, or the close switch 48 in the manual mode), the contact switch 114 is opened and the opening solenoid 104 is deenergized to allow the spring 122 to move the opening actuating valve 64 to its up position, thereby allowing the opening actuating valve 64 to exhaust rather than pressurize the industrial-valve motivator 36. In any event, by reversing the pressure input and exhaust of the opening actuating valve 64 and electrical actuation of its solenoid 104 the fail safe mode has been changed from a "fail in place" to a "fail-closed" configuration.

One adjusts the speed with which the valve position controller 10 controls the position of the industrial valve 29 by means of a handle 94' on the needle valve 94. In this regard, if an operator desires that the industrial-valve motivator 36 adjusts the position of the industrial valve 29 to a high resolution, that is, to have up to 160 positions, he must reduce the speed at which the industrial-valve motivator 36 moves. In this regard, when the system is operated for a high resolution, each position of the industrial valve 29 has a small interval and if the valve is moving too fast to a desired position, it will overshoot the position. Thus, if the speed is set too fast for a desired resolution oscillations will occur. These oscillations can be eliminated empirically by adjusting the needle valve 94. That is, the set point process controller 24 can be adjusted to have a particular resolution. The system is then run and when oscillations occur the needle valve 94 is adjusted to reduce flow through the exhaust muffler 94. Eventually, the flow will be adjusted until oscillations no longer occur. Thus, with the needle valve 94 one can adjust the system to obtain an optimal flow rate for a particular resolution.

While the invention has been particularly shown and described with reference to a preferred embodiment, it will be understood by those of ordinary skill in the art that various changes in form and detail may be made therein without departing from the spirit and scope of the invention. For example, the invention can be used with all types of pressurized fluids, including normal air and hydraulic fluids (including water). Instrument air is not required for this system.

Also, this system can be used with many types of valves, including rotary valves and linear valves. However, this system is particularly beneficial with linear valves and other applications, such as gate valves and dampers, which must be moved great distances and which are normally moved by a linear piston moving in a cylinder. The position controller 10 readily accepts linear feedback signals to allow long length linear applications.

It is extremely beneficial to have the check valves 72 and 74 in the input lines 68 and 70 of the pressurized fluid circuit 16 because these check valves tend to prevent drift of the industrial-valve 29', 29. If these valves were not there, there would be a closed circuit formed by the opening and closing lines 52, 54, the input fork 62 and the industrial valve motivator 36. These check valves make the system more stable in both the automatic and fail in place modes. If the system were to fail in place, both the opening port 56 and the closing port 60 would be pressurized so that undue drift could occur without the check valves. But also the check valves 72, 74 prevent the system from performing undue work to hold the industrial valve 29 in position when the industrial valve 29 is in a correct position during automatic operation.

A related benefit of this invention is that it does not need to perform an undue amount of work when the industrial valve is in a correct position in order to hold the industrial valve in this position.

The needle valve 94 provides a very important benefit in that it allows an operator to maximize the speed at which the system operates at a particular resolution.

Yet another highly beneficial feature of this invention is provided by the locking valves 80 and 82 which lock pressurized fluid in the intermediate opening and closing lines 76 and 78 when the system is in the manual mode and neither the open nor the close switch 50, 48 is depressed. This feature allows the system to have a manual mode which bypasses the comparator 100. This is important because once a valve has been manually placed in a particular position by depressing the appropriate close or open switch 48, 50 it cannot be allowed to drift from its set position. If the comparator were used in the manual mode, and there would be drift, the comparator 100 would realize this and move the industrial valve 29 back to its appropriate position. However, this would mean that the manual mode could only be used if the comparator were working properly. Thus, it is preferable to bypass the comparator for the manual mode. Therefore, it is necessary, in the manual mode, for the lines to be locked by the opening and closing locking valves 80 and 82.

Yet another highly beneficial aspect of this invention is that it can be converted so easily from a fail-in-place system to a fail-closed system by average operators. This conversion is brought about by simply closing the failure-select, or toggle, switch 112 and reversing connections of the input and exhaust lines 68 and 88 to the opening actuating valve 64. Although it is not described herein, it is also possible to similarly configure this invention so that it can be converted to a "fail open" mode by reversing appropriate valve connections and providing an appropriate electrical reversal. Although the toggle switch 112 shown in the drawings is located inside the housing 12, it could also be located on the outside of the housing. Further, reversal of the pressure input and exhaust lines 68 and 88 could be accomplished by a pneumatic switch as opposed to actually detaching and reattaching the lines. In fact, a switch could be provided which simultaneously reverses the pressure input and exhaust lines 68 and 88 and throws the toggle switch 112.

Although set point process controllers 24 already exist at many industrial installations, and are therefore not included in the depicted valve position controller 10, it would be possible to also include a set point process controller in the valve position controller, as a part thereof.

Yet another beneficial aspect of this invention is that a high resolution (number of possible valve positions) can be achieved therewith. In the depicted embodiment resolutions of up to 160 can be achieved. In another embodiment in which an analog PLC (programmable logic circuit) is used for the comparator, resolutions of up to 400 or higher can be achieved.

In the embodiment shown in FIG. 3 a terminal board 100' could be combined with the comparator 100, however, it is shown separate for purposes of illustration.

The embodiments of the invention in which an exclusive property or privilege are claimed are defined as follows:

1. A valve position controller for controlling the position of an industrial valve element of an industrial valve apparatus to thereby achieve a desired flow of conduit fluid through a conduit as measured by a fluid-condition transducer and monitored by a process controller, said industrial valve apparatus being of a type comprising a fluid-actuated motivator attached to said industrial valve element for moving said industrial valve element and a position-sensing transducer for producing an analog electrical signal corresponding to an actual position of the industrial valve element, said valve position controller comprising:

closing and opening actuating valves for respectively receiving pressurized actuating fluid from a pressure source and controlling flow of said actuating fluid to and from said motivator to thereby move said industrial valve element;

an electrical-signal comparator for receiving and comparing an electrical actual-position signal from said position-sensing transducer with an electrical desired-position signal from said process controller and producing control signals in response to a difference between said actual-position and desired-position signals;

closing and opening solenoids respectively coupled to said closing and opening actuating valves for receiving said control signals and respectively moving said closing and opening valves to positions for allowing flow of pressurized actuating fluid to and from said motivator for opening and closing said industrial valve element;

biasing means for biasing each of said closing and opening actuating valves to a home position when its respective closing and opening solenoid is not energized;

closing and opening input lines for respectively leading pressurized fluid from said pressurized source to each of said closing and opening actuating valves;

closing and opening exhaust lines leading exhausted pressurized fluid from said respective closing and opening actuating valves;

wherein said closing and opening actuating valves are biased to move to said home position upon loss of power; and, wherein the respective closing and opening input line can be interchanged with the respective closing and opening exhaust line of at least one of the closing and opening actuating valves so that upon a loss of power the fail safe position of the motivator depends upon the configuration of the input and exhaust lines of the at least one closing and opening actuating valve; and, wherein is further included an electrical switch for reversing operation of the solenoid of the at least one of the closing and opening actuating valves upon operation of the electrical switch so that the at least one of the closing and opening actuating valves will function to close and open the industrial valve element in response to the control signals of the comparator when said input and exhaust lines of said at least one of the closing and opening actuating valves are interchanged.

2. A valve position controller as in claim 1 wherein said biasing means biases said closing and opening actuating valves to allow pressurized fluid flow to said motivator from both said closing and opening input lines upon a failure of power so that said motivator fails in place.

3. A valve position controller as in claim 2 wherein is further included a mode switch for switching the valve position controller into a manual mode in which said control signals from said comparator are deactivated and manually operated close and open switches are energized so that said closing and opening solenoids can be manually energized for closing and opening the industrial valve element by said close and open switches.

4. A valve position controller as in claim 3 wherein is further included closing and opening locking valves respectively positioned between each of said closing and opening actuating valves and said motivator when said mode switch is in the manual-mode position and neither of said manually-operated close and open switches is activated to thereby lock the motivator in place.

5. A valve position controller as in claim 4 wherein:
closing and opening exhaust lines leading exhausted pressurized fluid from said respective closing and opening actuating valves are commonly joined at a fork and then exhausted through a common exhaust line; and
is further included a gradually adjusting flow valve on said common exhaust line for finely adjusting flow through said common exhaust line.

6. A valve position controller as in claim 3 wherein:
closing and opening exhaust lines leading exhausted pressurized fluid from said respective closing and opening actuating valves are commonly joined at a fork and then exhausted through a common exhaust line; and
is further included a gradually adjusting flow valve on said common exhaust line for finely adjusting flow through said common exhaust line.

7. A valve position controller as in claim 2 wherein:
closing and opening exhaust lines leading exhausted pressurized fluid from said respective closing and opening actuating valves are commonly joined at a fork and then exhausted through a common exhaust line; and
is further included a gradually adjusting flow valve on said common exhaust line for finely adjusting flow through said common exhaust line.

8. A valve position controller as in claim 1 wherein is further included a mode switch for switching the valve position controller into a manual mode in which said control signals from said comparator are deactivated and manually operated close and open switches are energized so that said closing and opening solenoids can be manually energized for closing and opening the industrial valve element by said close and open switches.

9. A valve position controller as in claim 8 wherein is further included closing and opening locking valves respectively positioned between each of said closing and opening actuating valves and said motivator when said mode switch is in the manual-mode position and neither of said manually-operated close and open switches is activated to thereby lock the motivator in place.

10. A valve position controller as in claim 9 wherein:
closing and opening exhaust lines leading exhausted pressurized fluid from said respective closing and opening actuating valves are commonly joined at a fork and then exhausted through a common exhaust line; and
is further included a gradually adjusting flow valve on said common exhaust line for finely adjusting flow through said common exhaust line.

11. A valve position controller as in claim 1 wherein:
closing and opening exhaust lines leading exhausted pressurized fluid from said respective closing and opening actuating valves are commonly joined at a fork and then exhausted through a common exhaust line; and
is further included a gradually adjusting flow valve on said common exhaust line for finely adjusting flow through said common exhaust line.

12. A valve position controller for controlling the position of an industrial valve element of an industrial valve apparatus to thereby achieve a desired flow of conduit fluid through a conduit as measured by a fluid-condition transducer and monitored by a process controller, said industrial valve apparatus being of a type comprising a fluid-actuated motivator attached to said industrial valve element for moving said industrial valve element and a position-sensing transducer for producing an analog electrical signal corresponding to an actual position of the industrial valve element, said valve position controller comprising:
closing and opening actuating valves for respectively receiving pressurized actuating fluid from a pressure source and controlling flow of said actuating fluid to and from said motivator to thereby move said industrial valve element;
an electrical-signal comparator for use in an automatic mode for receiving and comparing an electrical actual-position signal from said position-sensing transducer with an electrical desired-position signal from said process controller and producing control signals in response to a difference between said actual-position and desired-position signals;

closing and opening solenoids respectively coupled to said closing and opening actuating valves for receiving said control signals and respectively moving said closing and opening valves to positions for allowing flow of pressurized actuating fluid to and from said motivator for opening and closing said industrial valve element;

wherein is further included a mode switch for switching the valve position controller from said automatic mode into a manual mode in which said control signals from said comparator are deactivated and manually operated close and open switches are energized so that said closing and opening solenoids can be manually energized for closing and opening the industrial valve element by said close and open switches; and wherein is further included closing and opening locking valves respectively positioned between each of said closing and opening actuating valves and said motivator for closing to block actuating fluid flow to and from said motivator when said mode switch is in said manual-mode position and neither of said manually-operated close and open switches is activated but for opening to allow actuating fluid flow to and from said motivator when said mode switch is in said manual-mode position and either of said manually-operated closed and open switches is activated.

13. A valve position controller for controlling the position of an industrial valve element of an industrial valve apparatus to thereby achieve a desired flow of conduit fluid through a conduit as measured by a fluid-condition transducer and monitored by a process controller, said industrial valve apparatus being of a type comprising a fluid-actuated motivator attached to said industrial valve element for moving said industrial valve element and a position-sensing transducer for producing an analog electrical signal corresponding to an actual position of the industrial valve element, said valve position controller comprising:

closing and opening actuating valves for respectively receiving pressurized actuating fluid from a pressure source through respective closing and opening input lines and exhausting it through respective closing and opening exhaust lines to thereby control flow of said actuating fluid to and from said motivator and thereby move said industrial valve element;

an electrical-signal comparator for use in an automatic mode for receiving and comparing an electrical actual-position signal from said position-sensing transducer with an electrical desired-position signal from said process controller and producing control signals in response to a difference between said actual-position and desired-position signals;

closing and opening solenoids respectively coupled to said closing and opening actuating valves for receiving said control signals and respectively moving said closing and opening valves to positions for allowing flow of pressurized actuating fluid to and from said motivator for opening and closing said industrial valve element;

wherein is further included a mode switch for switching the valve position controller from said automatic mode into a manual mode in which said control signals from said comparator are deactivated and manually operated close and open switches are energized so that said closing and opening solenoids can be manually energized for closing and opening the industrial valve element by said close and open switches;

wherein is further included closing and opening locking valves respectively positioned between each of said closing and opening actuating valves and said motivator when said mode switch is in the manual-mode position and neither of said manually-operated close and open switches is activated to thereby lock the motivator in place;

wherein said closing and opening actuating valves are biased to move to a home position upon loss of power;

wherein said respective closing and opening input and exhaust lines of at least one of the closing and opening actuating valves can be interchanged so that upon a loss of power the fail safe position of the motivator depends upon the configuration of the input and exhaust lines of the at least one of the closing and opening actuating valves; and, wherein is further included an electrical switch for reversing operation of the solenoid of the at least one of the closing and opening actuating valves upon operation of the electrical switch so that the at least one of the closing and opening actuating valves will function properly to close and open the industrial valve element upon respective operation of the manually operated closing and opening switches in the manual mode and in response to the control signals of the comparator in the automatic mode when said input and exhaust lines of said at least one of the closing and opening actuating valves are interchanged.

\* \* \* \* \*